US006266705B1

(12) United States Patent
Ullum et al.

(10) Patent No.: US 6,266,705 B1
(45) Date of Patent: Jul. 24, 2001

(54) LOOK UP MECHANISM AND ASSOCIATED HASH TABLE FOR A NETWORK SWITCH

(75) Inventors: Daniel Ullum, San Jose; Thomas J. Edsall, Mountain View; Soei-Shin Hang, Sunnyvale, all of CA (US)

(73) Assignee: Cisco Systems, Inc., San Jose, CA (US)

( * ) Notice: Subject to any disclaimer, the term of this patent is extended or adjusted under 35 U.S.C. 154(b) by 0 days.

(21) Appl. No.: 09/162,730

(22) Filed: Sep. 29, 1998

(51) Int. Cl.[7] .................................................. G06F 15/173
(52) U.S. Cl. .......................................... 709/238; 711/216
(58) Field of Search ..................................... 709/238, 245, 709/236; 370/254, 401, 409; 711/206, 205, 216, 209, 208

(56) References Cited

U.S. PATENT DOCUMENTS

| 4,864,559 | 9/1989 | Perlman | 370/60 |
|---|---|---|---|
| 5,018,137 | 5/1991 | Backes et al. | 370/85.13 |
| 5,027,350 | 6/1991 | Marshall | 370/85.13 |
| 5,088,032 | 2/1992 | Bosack | 395/200 |
| 5,331,637 | 7/1994 | Francis et al. | 370/54 |
| 5,353,283 | 10/1994 | Tsuchiya | 370/60 |
| 5,361,256 | 11/1994 | Doeringer et al. | 370/60 |
| 5,394,402 | 2/1995 | Ross | 370/94.1 |
| 5,414,704 | 5/1995 | Spinney | 370/60 |
| 5,442,663 | 8/1995 | Perkins et al. | 370/94.1 |
| 5,500,860 | 3/1996 | Perlman et al. | 370/85.13 |
| 5,511,168 | 4/1996 | Perlman et al. | 395/200.15 |
| 5,583,996 | 12/1996 | Tsuchiya | 395/200.15 |
| 5,600,644 | 2/1997 | Chang et al. | 370/404 |
| 5,612,959 | 3/1997 | Takase et al. | 370/390 |
| 5,617,421 | 4/1997 | Chin et al. | 370/402 |
| 5,633,858 | 5/1997 | Chang et al. | 370/255 |
| 5,633,866 | 5/1997 | Callon | 370/397 |
| 5,684,800 | 11/1997 | Dobbins et al. | 370/401 |
| 5,740,171 | 4/1998 | Mazzola et al. | 370/392 |
| 5,742,604 | 4/1998 | Edsall et al. | 370/401 |
| 5,764,636 | 6/1998 | Edsall et al. | 370/256 |
| 5,796,732 | * 8/1998 | Mazzola et al. | . |
| 5,796,740 | 8/1998 | Perlman et al. | 370/401 |
| 5,818,842 | 10/1998 | Burwell et al. | 370/397 |
| 5,828,844 | 10/1998 | Civanlar et al. | 395/200.58 |

(List continued on next page.)

OTHER PUBLICATIONS

*Cisco Catalyst Workgroup Switch Version 3.0*, web, http://www.cisco.com/warp/public/558/16.html, pp. 1–5.
Cisco VLAN Roadmap, web, http://www.cisco.com/warp/public/538/7.html, pp. 1–9.
IAC (SM) Newsletter Database (TM) Communications Industry Researchers, Broadband Networks and Applications, copyright 1995 Information Access Company, a Thomson Corporation Company, Section No. 16, vol. E; ISSN: 1059–0544, Headline, Cisco Announces New Fast Ethernet Interface, pp. 2–3.

(List continued on next page.)

Primary Examiner—Mehmet B. Geckil
(74) Attorney, Agent, or Firm—Cesari & McKenna, LLP (57) ABSTRACT

An improved look up mechanism for accessing a RAM to obtain forwarding information for data frames being transported among ports of a high-performance switch is provided. The look up mechanism includes a multi-page look up table and associated hashing technique. A media access control (MAC) address and a virtual local area network (VLAN) identifier are transformed with a hash function to obtain a hash key. The hash key is an address pointing to a particular entry in the look up table. A virtual first page is also derived from the hash key, which selects a particular physical page of the look up table to be initially accessed each time that MAC address/VLAN pair is used. The look up mechanism may also be used to access a short cut table containing Layer 3 short cut information. In either case, ultimately, the likelihood is increased that a match will be found on the first RAM access, thus maintaining high-speed switch performance.

16 Claims, 5 Drawing Sheets

U.S. PATENT DOCUMENTS

| | | | |
|---|---|---|---|
| 5,852,607 | * 12/1998 | Chin | 370/401 |
| 5,892,912 | * 4/1999 | Suzuki et al. | 709/218 |
| 5,898,686 | 4/1999 | Virgile | 370/381 |
| 5,909,441 | 6/1999 | Alexander, Jr. et al. | 370/395 |
| 5,909,550 | 6/1999 | Shankar et al. | 395/200.57 |
| 5,914,938 | * 6/1999 | Brady et al. | 370/254 |
| 5,978,951 | * 11/1999 | Lawler et al. | 714/758 |
| 6,035,105 | * 3/2000 | McCloghrie et al. | 370/351 |
| 6,064,674 | * 5/2000 | Doidge et al. | 370/398 |
| 6,085,238 | * 7/2000 | Yuasa et al. | 709/223 |
| 6,097,729 | * 8/2000 | Chao | 370/463 |
| 6,104,696 | * 8/2000 | Kadambi et al. | 370/218 |
| 6,111,876 | * 8/2000 | Frantz et al. | 370/392 |
| 6,147,993 | * 11/2000 | Kloth et al. | 370/392 |

OTHER PUBLICATIONS

IAC (SM) Newsletter Database (TM) Communications Industry Researchers, Broadband Networks and Applications, copyright 1995 Information Access Company, a Thomson Corporation Company, Section No. 16, vol. 3; ISSN: 1059–0544, Headline, Cisco Announces Token–Ring Switching Products, pp. 4–5.

Cisco 7000 Series Gains Fast Ethernet Interface, Becomes Only Router Family to Support Three High–Speed Network Types, web, http://www.cisco.com/warp/public/146/199.html pp. 1–2.

ISL Functional Specification, web, http://www.cisco.com/warp/public/741/4.htm, pp. 1–4.

Cisco–Catalyst 5000 Software Release 2.1 Feature Set, web. http://www.cisco.com/warp/public/729/c5000/426 pp.htm, pp. 1–9.

IEEE Standard Project P802.1Q,Draft Standard for Virtual Bridged Local Area Networks, Copyright by the Institute of Electrical and Electronics Engineers, Inc.,Feb. 28, 1997, pp. 1–88.

Draft Standard P. 802.1Q./D10, IEEE Standards for Local and Metropolitan Area Networks: Virtual Bridged Local Area Networks, Copyright by the Institute of Electrical and Electronics Engineers, Inc., Mar. 22, 1997, pp. 1–212.

ISL Configurations for Cisco IOS and the Catalyst 5000, web, http://www.cisco.com/warp/public/741/8.html, pp. 1–8.

Dynamic Inter–Switch Link Protocol, 2.2 Configuration Note, pp. 2–6.

Virtual LANs, Catalyst 2820 Series and Catalyst 1900 Series Enterprise Edition Software Configuration Guide, Chapter 2, pp. 2–1—2–49.

Configuring VTP and LANs, Catalyst 5000 Series Software Configuration Guide, Chapter 13, pp. 13–1—13–24.

* cited by examiner

LOOK UP MECHANISM AND ASSOCIATED HASH TABLE FOR A NETWORK SWITCH

FIELD OF THE INVENTION

This invention relates generally to network switches and, more specifically, to an improved look up mechanism and associated multi-page hash table used for improved performance in retrieving information and making forwarding decisions in a network switch.

BACKGROUND OF THE INVENTION

A network switch of a data communications network provides a "switching function" for transferring information, such as data frames, among entities of the network. Typically, the switch is a computer comprising a collection of components (e.g., cards) interconnected by a backplane of wires. Each card may include a limited number of ports that couple the switch to the other network entities over various types of media, such Ethernet, FDDI or token ring connections. A network entity may consist of any device that "sources" (i.e., transmits) or "sinks" (i.e., receives) data frames over such media.

The switching function provided by the switch typically comprises receiving data at a source port from a network entity, transferring the data over the backplane to a destination port and, thereafter, transmitting that data over a medium to another entity of the network. In order for the data to be transferred, the switch may include a forwarding engine and associated address translation mechanism. An example of such an address translation mechanism is described in U.S. Pat. No. 5,740,171, issued Apr. 14, 1998, entitled ADDRESS TRANSLATION MECHANISM FOR A HIGH PERFORMANCE NETWORK SWITCH, which is commonly owned by the assignee of the present invention. The address translation mechanism described therein quickly and efficiently renders forwarding decisions for data frames transported among ports of a high-performance switch on the basis of, inter alia, virtual local area network (VLAN) associations among the ports.

The translation mechanism comprises a plurality of forwarding tables, each of which contains entries having unique index values that translate to selection signals for ports destined to receive the data frames. Each port is associated with a unique index value and a VLAN identifier to facilitate data transfers within the switch at accelerated speeds and addressing capabilities.

As described in the patent, a media access control (MAC) address is combined with the VLAN identifier to produce a base line numerical quantity for searching the forwarding tables. Each table entry is directly accessed, however, by a key comprising a hash transformation of this MAC/VLAN quantity. A comparison circuit arrangement of is the mechanism is also provided to validate the forwarding table entry mapped by the hashed MAC/VLAN quantity. That is, the circuit arrangement compares the base line numerical quantity to a MAC/VLAN value stored in the mapped entry to ensure that the entry contains the correct index value. If the compared items match, the index value stored in the table is provided to a target logic circuit for translation to a signal that selects a port or group of ports for receiving the data frame. If the items do not match, the VLAN identifier is passed to the target logic circuit with the result that all ports having that VLAN identifier receive the frame in accordance with a multicast transfer.

The hash function used to find the index value maps a large address space with a much smaller address space. In doing so, however, aliasing can occur in that more than one key, for example, a MAC address/VLAN pair, can hash to the same table entry. One solution to this limitation has been to provide a hash table comprising several pages which can be used as alternates when a particular key (e.g., MAC address/VLAN pair) hashes to the same table entry. For example, a first MAC address/VLAN pair may hash to a particular table entry in which case that entry (or line) corresponding to the first page of the table is thereafter associated with that MAC address/VLAN pair. If a second MAC address/VLAN pair hashes to the same value, thus pointing to that same entry, then it is stored in the corresponding entry on the second page of the table.

The problem with this type of paging scheme, however, is that it increases the overall table access time because the hash transformation may not always result in a "hit" on the first page accessed. Specifically, after the hashed address is calculated, it is used to point to the entry (or line) to access, but the look up always begins on the first page. If a match is not found, the corresponding entry on the second page is checked, and if there is no match this procedure continue s through all the pages of the table until a match is realized. In such conventional systems, the order in which pages are accessed, including which page is accessed first, is the same for all hashed addresses. But, serially checking the various pages consumes time, perhaps on the order of several cycles. Optimum performance, namely highest speed, is achieved when the desired entry is found on the first page checked.

Therefore, it is among the objects of the present invention to provide a mechanism for high-speed look up of hash table information needed for rendering forwarding decisions in a network switch.

Another object of the present invention is to provide a hashing technique which increases the likelihood of accessing desired data upon a first look up of a hash table.

It is a further object of the present invention to provide a mechanism that efficiently implements "port-based" VLAN association operations within a high-performance network switch.

SUMMARY OF THE INVENTION

Briefly, the invention relates to an improved look-up mechanism for storing and retrieving forwarding information used to transport data frames among ports of a high-performance network switch. The look-up mechanism includes a look-up table having a multi-page architecture that is accessed in accordance with a novel, dual hashing technique. Broadly stated, the dual hashing technique first assigns a mapping between a first virtual page to the physical page of the look-up table to be initially accessed. Secondly, the hashing technique points to a particular entry (or line) in the table on that identified page. The dual hashing technique is used for both initially storing and for ultimately retrieving information from the look-up table. Use of the technique increases the likelihood that a match will be found on a first look up operation to the table.

In the illustrative embodiment, the hash table is configured as a number of physical pages with each page containing an equal number of entries. Equivalent entries on each page form a line. In accordance with one embodiment of the invention, a single, large hash key is derived from a MAC address/VLAN pair involved in the forwarding decision. The larger hash key is generated to effectively produce two hashes. One set of predetermined bits (e.g., the most significant bits (MSBs)) of the hash key are decoded to obtain a value which designates the mapping between the virtual first page and the physical page to access first for that hash key. The remaining bits in the large hash key are used to identify the particular line on that page in the table to access. Initially, the corresponding forwarding information (i.e., the MAC/VLAN pair and the corresponding index) is stored in that location in the look-up table. In this manner, each time that particular MAC address/VLAN pair subsequently is received by the forwarding engine in a forwarding operation, the same physical location of the look-up table is checked first, and the forwarding index is thus retrieved upon a single access. In an alternative embodiment, two separate hashes can be performed, one may be used to obtain the page-to-page mapping, and the other, to identify the line on the corresponding page.

More specifically, when the forwarding engine receives a frame, it contains a destination address and a source address. The destination address is hashed to obtain the hash key and the virtual first page (VFP) is determined from a predetermined number of bits of the key. That VFP is initially accessed. The remaining bits of the hash key are used to point to a line on that page. If the entry pointed to on that page is valid, it is verified as correct, and if so, then the forwarding information (the index) is retrieved.

If the designated location contains valid information, but the key information does not match the incoming address, then, subsequent pages are to be accessed. When subsequent pages are to be checked, the mapping continues sequentially such that the second page to be accessed is the next sequential physical page after the VFP. In other words, if the virtual first page is mapped to page 3 of the table, then the mapping continues such that the second page to be accessed is page 4, and so on.

The speed of the look-up process can be further increased by using an associated table which contains valid bits to indicate which look up table entries are valid. In this case, only valid entries are checked in the order identified by the page-to-page mapping technique until a match is found. If no match is found after all valid entries on that line are checked, then a miss is declared, and a learning mode of operation is initiated.

During the learning mode of operation, the MAC address/VLAN pair is hashed to obtain the hash key, as described. A predetermined quantity of bits, which may be the MSBs of the key, or the result of a separate hash, are translated to a virtual first page assigned to that MAC address/VLAN pair. The VFP is accessed, and the MAC address/VLAN information (and the associated index) is stored on the line pointed to on that particular page, (assuming the location is empty.) In this way, when the look up engine subsequently receives a frame with that particular MAC address/VLAN pair, the same entry on the same virtual first page is accessed and the forwarding information is thus obtained on the first look up.

On the other hand, if the particular entry is not empty, i.e., other valid information is stored therein (because of a previous hash to the same address), then the MAC address/VLAN information is stored in the same location on the next physical page, or on the next page containing an invalid (available) entry during the learning operation. Most likely, it will only take two or three pages to arrive at an empty entry in which the information can be stored. Thereafter, if that particular MAC address/VLAN pair is received by the forwarding engine as a destination address, and the virtual first page assignment is used to start the look up process, even though the information is not obtained on the first look up, it will be found on the second (or third) access of the table. This approach still reduces the number of total accesses that may have been required in prior systems, thus increasing the high-speed performance of the switch.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
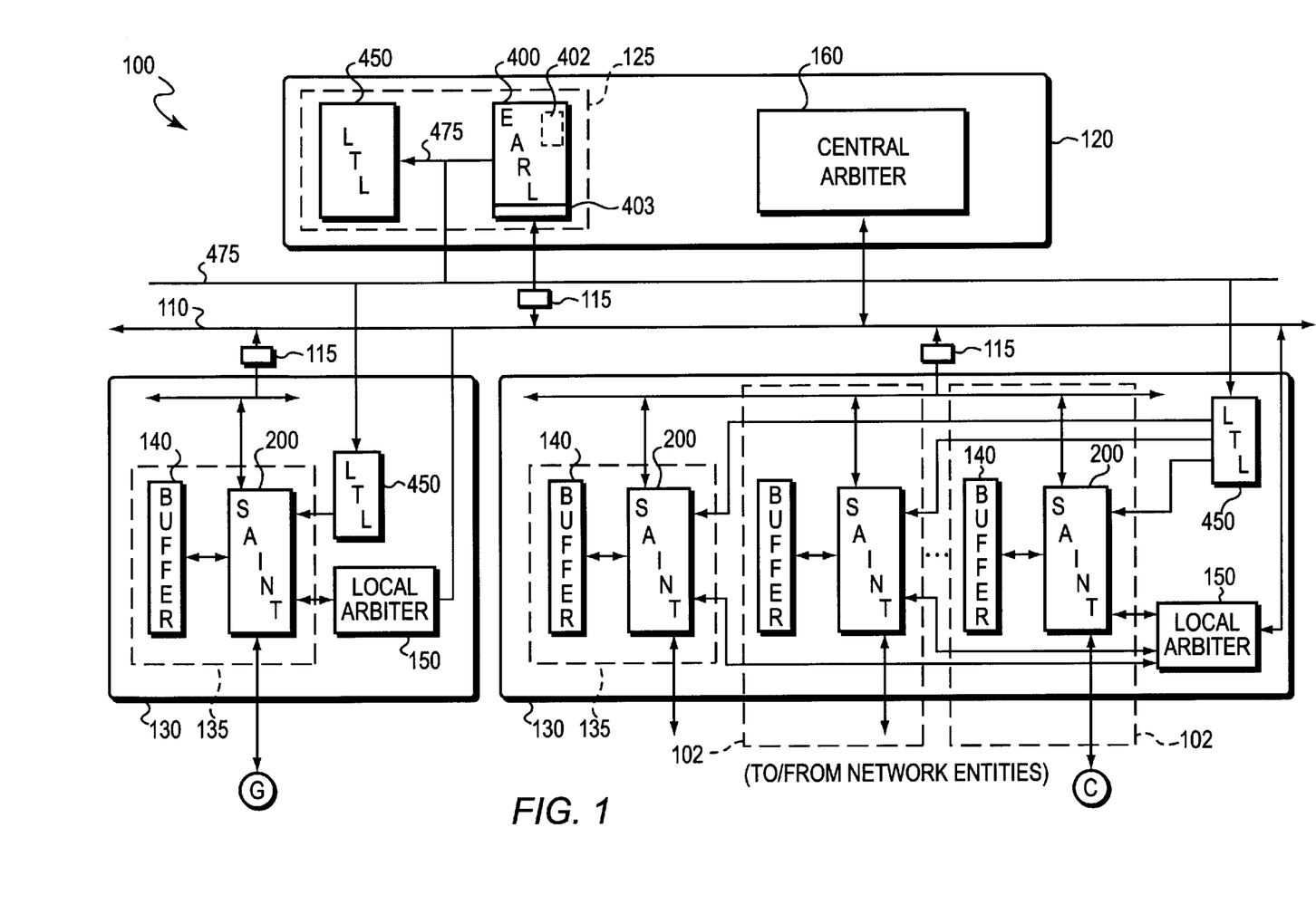
FIG. 1 is a schematic block diagram of a network switch comprising a high performance switching bus for interconnecting ports that may be advantageously used with the present invention.

FIG. 1 is a schematic block diagram of a network switch 100 comprising a high-performance switching bus 110 for interconnecting ports 102 that couple the switch to network entities of a data communications network. The ports may be implemented on various cards of the switch, including a supervisor card 120 and a plurality of line cards 130. Each line card may have as many as 64 ports situated thereon, while the supervisor card may contain no ports. Communication among the ports/cards occurs synchronously over the switching bus 110 using periodic bus cycles. The switching bus is preferably a 48-bit bus having a bus cycle of 40 nsecs (25 MHz) and an effective data rate of 1.2 Gb/s.

The architecture of the switching bus is preferably implemented as forwarding engine circuitry 125 and port interface circuitry 135 that cooperate to efficiently transmit data to, and receive data from, the switching bus 110. The forwarding engine 125 is located on the supervisor card 120 and comprises an encoded address recognition logic (EARL) circuit 400 coupled to a local target logic (LTL) circuit 450 over a result bus 475. Functionally, the EARL 400 executes all forwarding decisions for the switch 100. The look up mechanism and associated hash table circuitry 402 of the present invention are located within the EARL circuit 400. The LTL 450 implements those forwarding decisions by selecting ports as destinations for receiving data frames transferred over the switching bus 110. As can be seen in FIG. 1, the LTL may be distributed among the cards of the switch via the result bus 475.

Each port 102 of the switch is controlled by port interface circuitry 135 comprising a synchronous advanced interface network termination (SAINT) circuit 200 coupled to a frame buffer 140, which is preferably a first-in, first-out (FIFO) memory. The SAINT 200 provides media access control (MAC) and direct memory access (DMA) capabilities for the switch 100. Specifically, the DMA capability provides buffer management of the frame buffer 140 and an interface to the switching bus 10, while the MAC capability allows attachment of the switch 100 to a network entity. The network entity may comprise a processor or similar circuit that interfaces with network media, such as Ethernet, FDDI or token ring connections.

In the illustrative embodiment, a buffer circuit 115 connects each card to the switching bus 110. This circuit 115 is located on the switching bus 110 and provides a single clock (i.e., 40 nsec) delay between the bus and each port 102 on the card. The buffer circuit 115 maintains proper loading on the backplane so that data transmitted from the ports can be properly driven onto the bus. Further details of the circuits which implement data transfer within the switch, and the operation of the switch are set forth in commonly assigned U.S. Pat. No. 5,740,171, issued on Apr. 14, 1998, entitled ADDRESS TRANSLATION MECHANISM FOR A HIGH-PERFORMANCE NETWORK SWITCH, and U.S. Pat. No. 5,796,732, entitled ARCHITECTURE FOR AN EXPANDABLE TRANSACTION-BASED SWITCHING BUS, issued on Aug. 18, 1998 which patents are hereby incorporated by reference as though fully set forth herein.

Packet data, such as destination addresses, for example, are sent to the forwarding engine 125 in the following manner: the data on bus 110 (FIG. 1) is buffered in the buffer is circuit 115. As the data comes into the EARL circuit 400, it is sent into a parsing block 403 within the EARL circuit 400. The parsing block 403 extracts the MAC addresses, VLAN and source index of the frame being processed. The parsed information passes across an internal data path within the EARL circuit 400. This data path, called the EBUS, has been omitted from FIG. 1 for purposes of improved clarity. The parsed data passes into the forwarding engine 125 off the EBUS, via an EBUS interface (I/F) 208 (FIG. 2).

Figure 2:
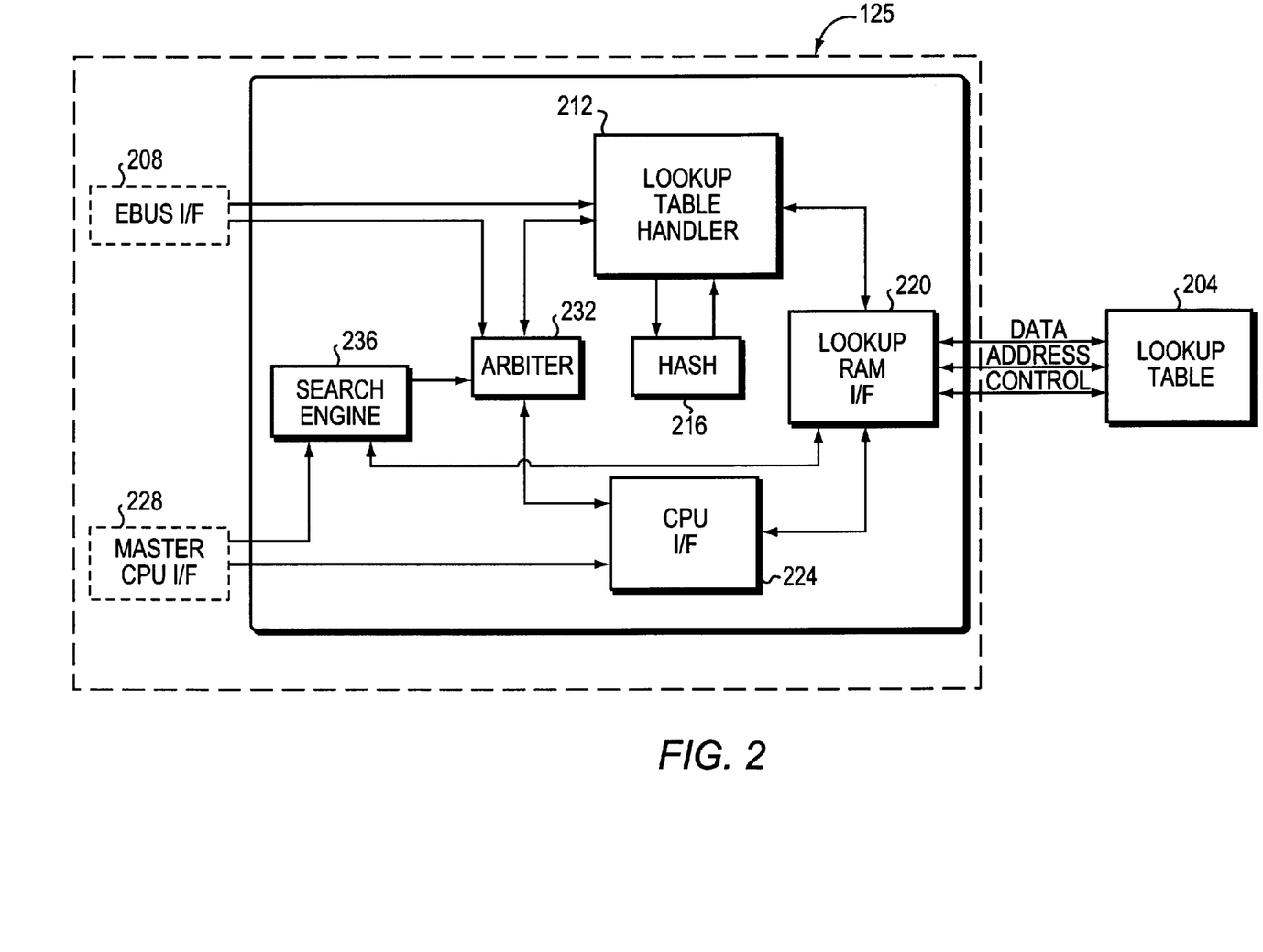
FIG. 2 is a schematic block diagram of a forwarding engine and associated look up table with which the look up mechanism and hashing technique of the present invention may be used.

FIG. 2 illustrates in further detail the forwarding engine 125, which is responsible for guiding and implementing the forwarding decisions for packets traversing the switching bus 110 (FIG. 1). A storage element, such as a random access memory (RAM) 204 stores the packet information needed for making the forwarding decisions. As described herein, the packet information in RAM 204 is preferably organized within data structures, such as a look up table, for use in efficiently rendering such decisions.

A look up table handler 212, which is described in further detail herein, performs look up operations for both destination addresses (for forwarding) and source addresses (for learning). The look up table handler 212 accesses the look up table 204 to obtain the port index which correlates with a particular source address (SA) or destination address (DA) in order to provide selection signals used for forwarding packets within the switch. The look up table handler 212 further notifies the forwarding engine 125 whether the table access successfully produced the desired information ("hit"), or that the information was not found ("miss"). The look up table handler 212 also performs a write back function during learning operations.

In the illustrative embodiment, the port index information stored in the look up table 204 is accessed by a 17-bit address, whereby three bits identify the mapping between the virtual first page and the physical page to be accessed first, and the remaining 14 bits point to a line on that page. The incoming source and/or destination address information, on the other hand, which includes the SA or DA MAC address and the VLAN designation, is typically in a 64-bit format. Thus, in accordance with the illustrative embodiment of the present invention, a single hash circuit 216 maps the 64-bit entity (the MAC address and VLAN data and an optional configuration quantity) into a 17-bit key. If desired, two separate hashes could be employed to produce a three-bit quantity and a separate 14-bit quantity, if desired in a particular application, but it is presently preferred to use a single hashing element 216 to produce a single, 17-bit hash key, from which both the virtual first page and the line are determined.

A look up table interface circuit 220 generates the clocking information for data, address and control signals entering and exiting the look up table 204. A CPU interface circuit 224 allows an external CPU (not shown) to access the look up table 204 via a master CPU interface 228. An arbiter circuit 232 arbitrates accesses to the look up table 204 from among the EBUS interface 208, the CPU interface 224 and an associated search engine 236 in accordance with a conventional arbitration algorithm.

Figure 3:
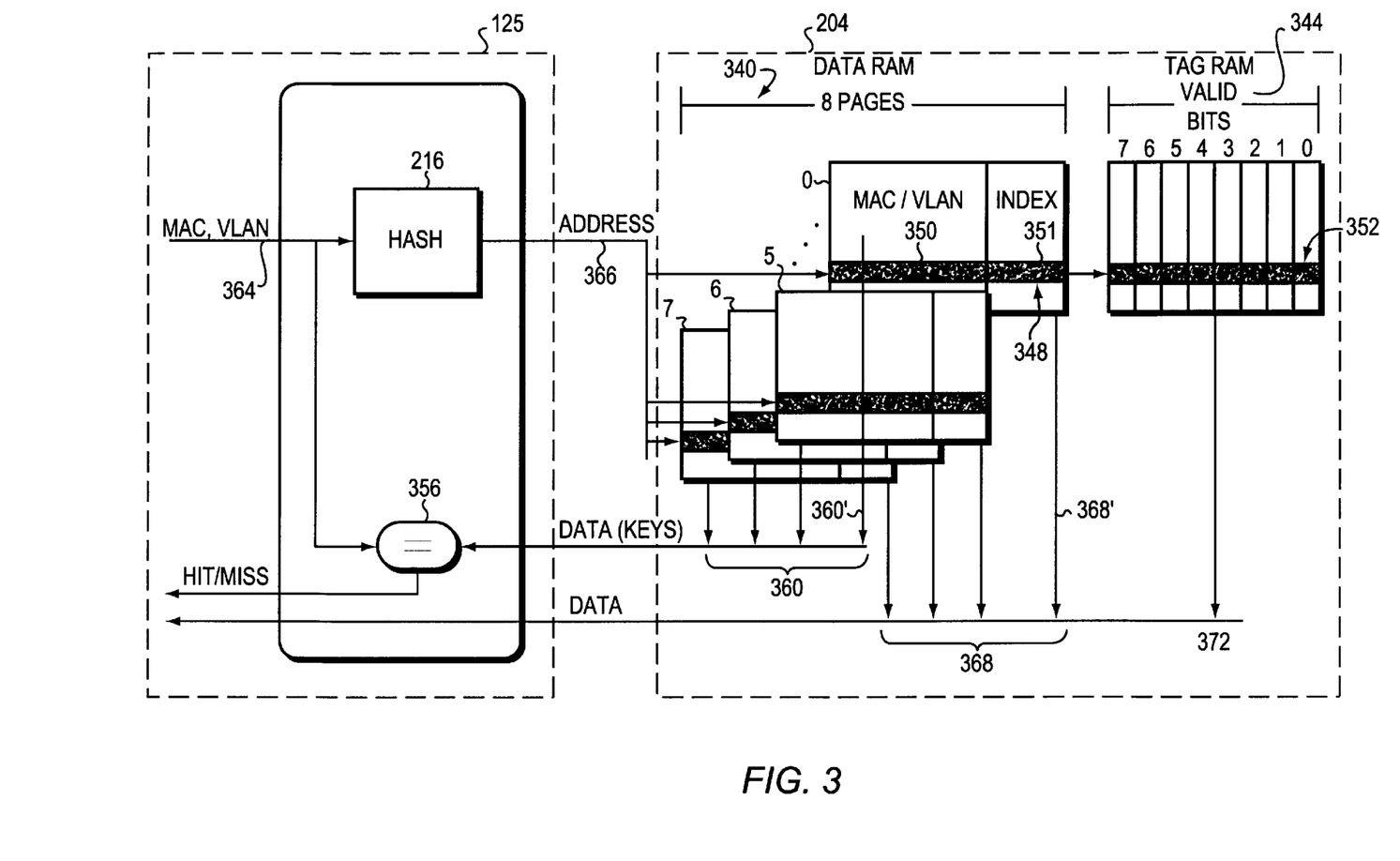
FIG. 3 is a schematic block diagram of one embodiment of a look up table configured in accordance with the present invention including a data RAM and a tag RAM.

FIG. 3 illustrates, in further detail, the look up mechanism and look up table of the present invention. The look up table 204 may, in a preferred embodiment, be configured as two tables, with the first table being a data RAM 340 which stores the parsed forwarding data, and a second table being a tag RAM 344, which stores valid bits associated with each entry. A valid bit indicates that an entry is full and contains valid forwarding information. An invalid bit indicates that a particular location is empty and, thus, does not contain valid information.

In accordance with the present invention, the data RAM 340 is preferably organized as a plurality of pages, e.g., pages 0 through 7, each containing 16,384 entries 348. Thus, in the illustrated embodiment, there are total of 131,072 entries in the data RAM 340. Similarly, the tag RAM 344 comprises eight pages, designated pages 0 through 7. Each page contains 16,384 lines 352 wherein each line corresponds to a respective entry 348 of the data RAM 340. Each such entry contains valid/invalid bits to indicate whether valid forwarding information is contained within the corresponding entry in the data RAM 340. It should be understood that a different architecture may be selected for the RAM 340 and the RAM 344 while still remaining within the scope of the present invention.

Each entry 348 of the data RAM 340 contains a MAC address and VLAN designation pair 350, and, in addition, associated data 351, comprising an index identifying the port to which the frame is to be sent. In the illustrative example, typical "switching" (Layer 2) forwarding information is stored in the look up table 204; however, the look up table 204 may also contain other information, such as, for example, information for Layer 3-type processing. In either case, the information stored in the look up table 204 is directly accessed by the 17-bit key comprising a hash transformation of the MAC address/VLAN pair obtained by the forwarding engine 125 as an SA or a DA for a particular packet.

A comparison circuit arrangement is provided to verify the forwarding table entry 348 mapped by the hashed MAC address/VLAN pair. A comparator 356 is coupled to the MAC/VLAN pair portion 360 of the outputs of the data RAM 340. The particular MAC/VLAN pair 360' retrieved from the data RAM 340 is compared with the incoming address (MAC/VLAN) 364 of the data frame received from the forwarding engine. If the compared items match, and the corresponding valid bit is set, the associated data (the index value) stored in the data portion 351 of selected entry 348 is retrieved as output 368'.

Figure 4:
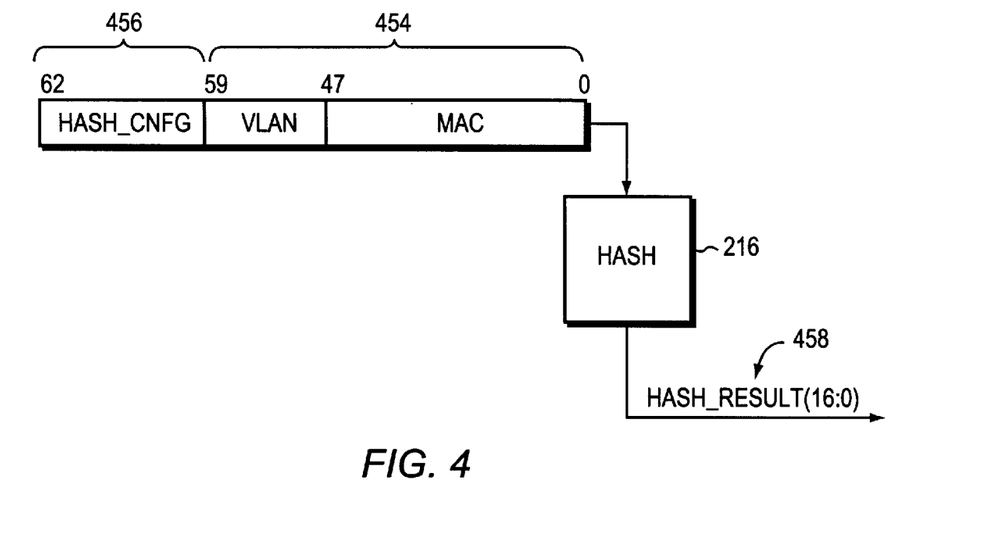
FIG. 4 is a schematic bit map of the hash key utilized in accordance with one embodiment of the present invention.

FIG. 4 is a schematic block diagram illustrating an input to the hashing element 216. In a preferred embodiment, the hash function of element 216 is implemented using a 17th order polynomial. Alternatively, the hash may be implemented using another conventional hash algorithm as desired in a particular application. In accordance with the invention, the MAC address/VLAN quantity comprises the baseline data bits 454 for performing the forwarding decisions.

Additionally, in the illustrative embodiment of FIG. 4, a 4-bit hash configuration quantity 456 is added to the input to be hashed. This 4-bit hash configuration quantity 456 is a constant which can be added to the hash input if, in a particular instance, more than an acceptable amount of inputs are hashing to the same entry. In such a case, the quantity 456 is added to the hash input to enhance the hashing results so that only a minimum of inputs hash to the same value. The input quantity comprised of bit quantities 454 and 456 is hashed by hashing element 216 to produce a 17-bit (16:0) key as the hash result 458.

Figure 5:
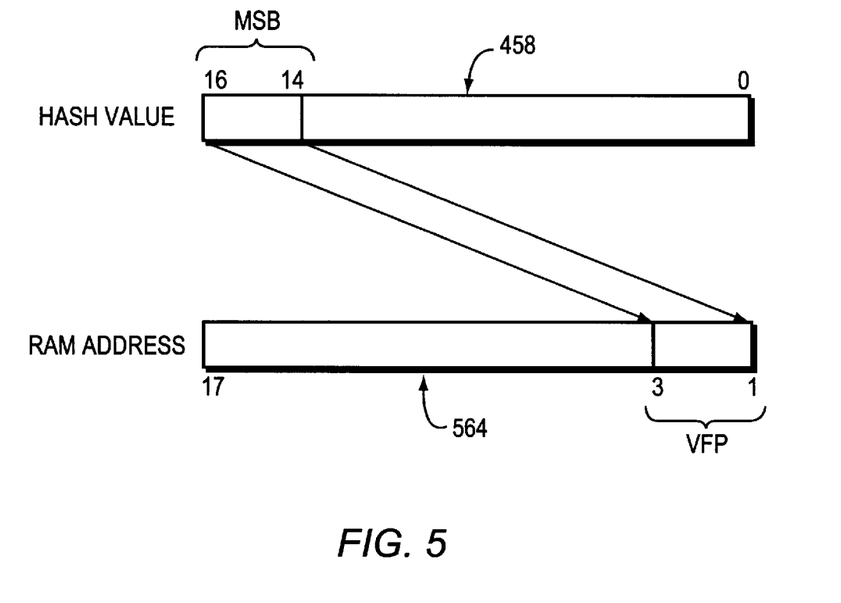
FIG. 5 is a schematic bit map of the hash key compared with the RAM address in accordance with one embodiment of the invention.

As noted, the hash key 458 is used as an address 564 for the data RAM 340 (FIG. 3). As illustrated in FIG. 5, the most significant bits (MSBs), e.g., bits 14, 15 and 16 of hash value 458, are preferably used to identify the VFP to access in RAM 340. Specifically, the MSBs are transposed into the least significant bits (LSBs) of the RAM address 564 and decoded (mod 2^) to identify one of physical pages 0 through 7 of the data RAM 340 as the virtual first page associated with the particular MAC address/VLAN pair. The remaining bits 4 through 17 of the address 564 designate the entry, from any of the 16,384 entries on that page, to be accessed.

It should be understood that using the MSBs of the hash key 458 is one preferred method of determining the virtual first page assignment. However, a different set of bits (e.g., LSBs) may be selected. Alternatively, in a system in which the look-up table architecture differs, another quantity of bits may be preferable in that particular application. Further, in the alternative, a second, separate hash function may be employed to derive a value associated with the virtual first page.

Referring back to FIGS. 3 and 5, if the entry 348 specified by bit 564 is valid, a comparison is performed between the MAC address/VLAN quantity 454 and the contents of field 350 to verify that the index contained in field 351 is the correct one. If the quantities do not match, the look up mechanism increments to the next valid page, and cycles through all of the valid entries on a line. In response to a match, the index is retrieved and the look up is complete. Otherwise, if all valid entries are cycled through, a miss is declared. Next, the learning process is performed.

More specifically, if a frame is received having a source address ("C") and a destination address ("G") and the destination address G is not in the forwarding table, a broadcast (e.g., flood) sequence is followed. Accordingly, the EARL 400 (FIG. 1) forwards a predetermined index value over the result bus 475 to the LTL 450 (FIG. 1) that preferably represents a flood destination address. In response to this multicast address, the LTL locates a corresponding binary-coded value that selects each port on the switch; therefore, every port including the intended destination G receives the frame. In the meantime, EARL 400 records the association between the source port "C" and its index which would have been contained in the source field in the frame in the look up table 204.

A response frame is generated by the station, or port (G). The SAINT 200 appends the index value for port G to the response frame by inserting the index into the index field as the source address index. Port G then transmits the response frame over the bus 110 with a destination address of port C and a source address of port G.

Upon receiving the headers of the response frame, EARL searches for the destination address port C in the look up table 204 and finds the index previously learned. It then forwards this index over the result bus 475 to the LTL 450; the LTL responds with a port selection mask selecting the appropriate port on the appropriate card. It is noted that the contents of the LTL are preprogrammed by a control processor prior to initialization of the switch. During this sequence of events, EARL also learns the index value associated with port G because that value was in the response frame as the source index. The index for port G is then recorded in the look up table 204.

The details of the operation of an illustrative embodiment of a switch with which the present invention can be employed are set forth in commonly-assigned U.S. Pat. No. 5,796,732, entitled ARCHITECTURE FOR AN EXPANDABLE TRANSACTION-BASED SWITCHING BUS, which was previously cited and incorporated herein.

The index for destination address G, now obtained by EARL 400 along with the MAC address/VLAN information, is stored in the location referenced to by the hash key and the VFP in accordance with the invention. Subsequently, when the look up engine receives a frame with that MAC address/ VLAN pair, the proper entry is located on the virtual first page and the appropriate information is obtained.

As noted, if the particular entry pointed to is not empty, i.e., other valid information is stored therein, then the mapping continues in sequence and the MAC address/ VLAN information is stored on the next sequential physical page, or on a next, subsequent physical page having an available entry on that line. For example, if the MSBs of the 17-bit hash key decode to identify physical page 3 of the data RAM 340 as the VFP, then, if the line pointed to on that page is full, then the look-up mechanism of the present invention increments to physical page 4, then page 5, and continues to cycle through to page 7, and wrap around to page 0, page 1, and finally, page 2 of the data RAM 340 to check for an available location. Most likely, it will only take two or three page accesses to arrive at an empty entry in which the information can be stored. Thereafter, if that particular MAC address/VLAN pair is received by the forwarding engine as a DA, the virtual first page assignment is used to start the look up process, and even though the information is not obtained on the first look up, it will be found on the second (or third) access of the table. This approach still reduces the number of total accesses that had been required in prior systems, thus maintaining the desired high-speed performance of the switch.

Figure 6:
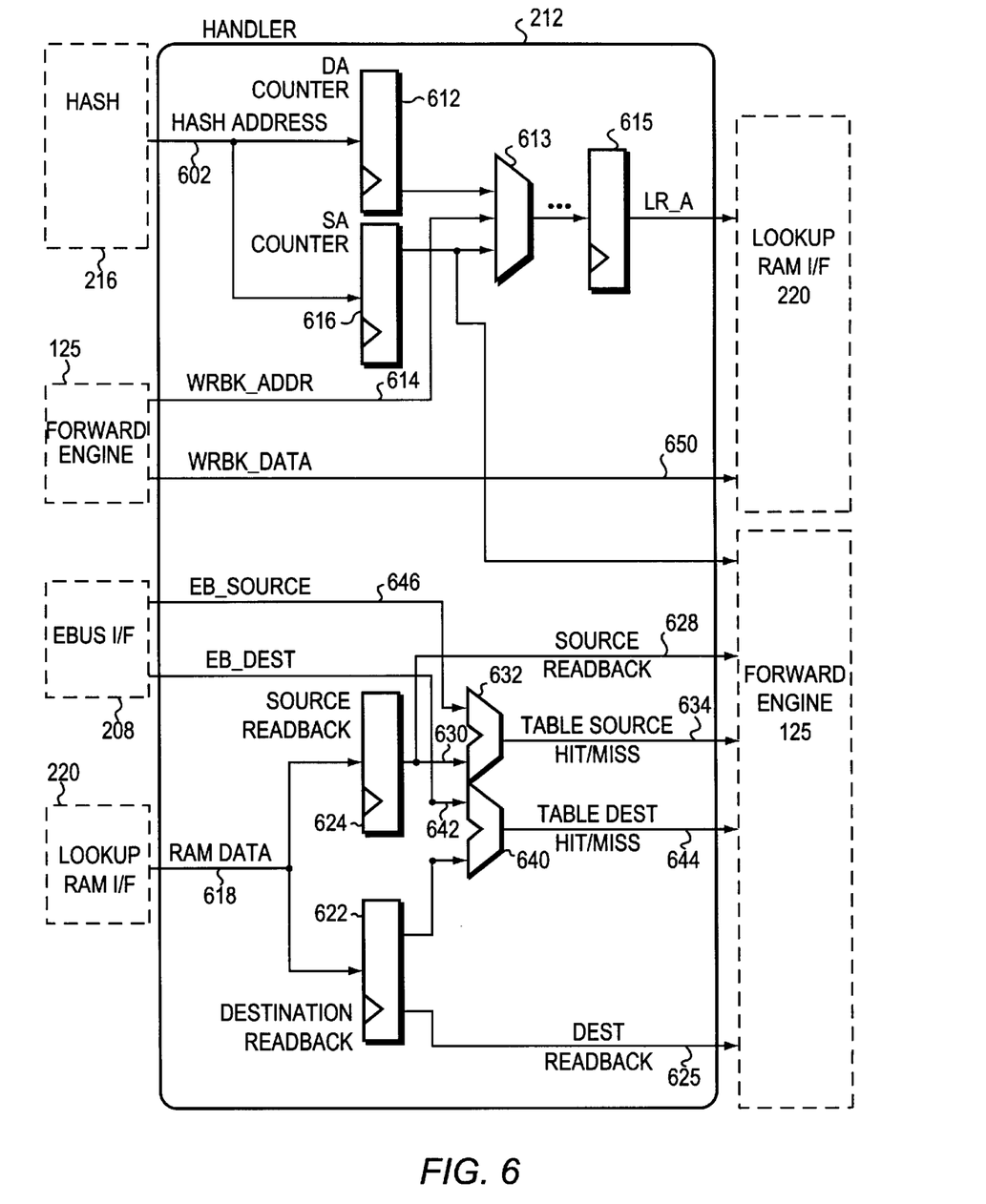
FIG. 6 is a schematic block diagram of the look up table access handler of the present invention.

In operation, the look up mechanism of the present invention is embodied in the look up table access handler circuit 212 which is illustrated in FIG. 6. Hashing element 216 is enabled as MAC address/VLAN designations become available from the forwarding engine 125. The hash key, derived from the MAC address/VLAN designation, is provided at 602 to destination address (DA) counter 612 or to source address (SA) counter 616, whichever is selected. If desired, a single counter may also be used. A multiplexer 613 has as its inputs, the output of the destination counter 612, the output of the source counter 616, and a writeback entry 614. A selected one of those inputs is transmitted to look up RAM interface 220.

For destination look up, for example, the RAM data retrieved in the access is then returned (at line 618 in FIG.

6), and is provided to a destination readback component 622. The destination readback data is compared in the comparator 640 with the destination address 642 of a currently-manipulated frame, to determine if the access resulted in a hit or a miss. A hit/miss signal is provided to the forwarding engine as illustrated by line 644, and if it is a hit, the destination address is read back to forwarding engine 125. Destination readback data is provided as illustrated at line 625 to the forwarding engine 125.

Similarly, source data may be retrieved (618). The source readback data is provided to the forwarding engine as illustrated by line 628, and is compared with the source address 646 in comparator 632. A hit or miss indication is provided at 634 to the forwarding engine 125. In the course of a learning operation, the writeback address 614 and writeback data 650 is provided from the forwarding engine 125 to the look up RAM I/F 220 as shown in FIG. 6.

In this manner, the look up table is accessed, using the virtual first page assignments to determine the page to be initially accessed. Ultimately, this results in an increased likelihood that the desired data will be found on the first look up of the table.

While there has been shown and described an illustrative embodiment for implementing a high speed look up mechanism for network switch forwarding decisions for Layer 2 forwarding, it is to be understood that various other adaptations and modifications may be made within the spirit and scope of the invention. For example, the improved look up mechanism of the present invention may be advantageously used to increase speed of access of a short cut table for obtaining Layer 3 short cut information in the case where the table containing such Layer 3 short cut information is configured in multiple pages and is accessible by a hash key transformation of an incoming address. Details of a system which implements Layer 3 short cut techniques are set forth in commonly assigned U.S. Pat. No. 6,147,993, entitled METHOD AND APPARATUS FOR IMPLEMENTING FORWARDING DECISION SHORTCUTS AT A NETWORK SWITCH, issued Nov. 14, 2000 is hereby incorporated by reference as though fully set forth herein. In such a case, the short cut table is accessed based, in part, on source and destination MAC addresses. Thus, the Layer 3 system can be readily adapted for use with the look up mechanism and hashing technique of the present invention.

The foregoing description has been directed to specific embodiments of this invention. It will be apparent, however, that variations and modifications may be made to the described embodiments, with the attainment of some or all of their advantages. Therefore, it is the object of the appended claims to cover all of such variations and modifications as come within the true spirit and scope of the invention.

What is claimed is:

1. A look up mechanism for retrieving forwarding information in connection with forwarding decisions rendered by a forwarding engine for data frames transported among ports of a high performance network switch in accordance with virtual local area network (VLAN) associations among the ports, the look up mechanism comprising:

(A) a look up table, configured as a plurality of physical pages, with each physical page containing a plurality of entries, each entry for storing address information including a media access control (MAC) address and a VLAN designation in addition to associated data that includes a unique index value identifying a port associated with that MAC address/VLAN pair;

(B) table access means including at least one hashing element coupled between the forwarding engine and said look up table, said hashing element generating a hash key by hashing an incoming MAC address/VLAN pair received by said forwarding engine; and (C) means for deriving a virtual first page from said hash key for a particular MAC address/VLAN pair which virtual first page maps the virtual first page to a physical page of said look up table to be initially accessed, and said hash key also providing mapping to a selected one of said forwarding table entries on that particular virtual first page.

2. The look up mechanism of claim 1 further comprising comparison means coupled between an output of said look up table and said forwarding engine, said comparison means for comparing the address information retrieved from said look up table with the MAC address/VLAN pair received by the forwarding engine, and means for generating a signal indicating whether a match was found, whereby the correct index value is extracted from said look up table.

3. The look up mechanism of claim 2 wherein said table access means increments to a next sequential physical page in said forwarding table after said virtual hash page in the event that the selected table entry does not contain the same MAC address/VLAN pair as that address received by said forwarding engine, and said table access means continually checks sequential pages, and generates:

(i) a first signal indicating that a match was found;

(ii) a second signal indicating that all sequential pages were checked and no match was found; and (iii) a third signal, responsive to said second signal, said third signal indicating that that said look up mechanism initiates a learning mode of operation.

4. The look up mechanism of claim 3 further comprising learning means coupled to said look up table, said learning means being responsive to said third, learning mode signal, and having means for writing a particular MAC address/ VLAN pair and an associated index value into a selected available location in said look up table.

5. The look up mechanism of claim 1 wherein said means for deriving a virtual first page selects a predetermined set of bits of said hash key obtained from a particular address, and further decodes said predetermined set of bits to obtain a page number, said page number corresponding to a physical page of said forwarding table to be initially accessed when that particular address is received by said forwarding engine.

6. The look up mechanism of claim 5, wherein said predetermined set of bits are the three most significant bits of said hash key.

7. The look up mechanism of claim 1, wherein said means for deriving said virtual first page includes secondary hash means producing a 3-bit entity, and means for decoding said 3-bit entity to determine a page number, said page number corresponding to a physical page of said forwarding table to be initially accessed when that particular forwarding address is received by said forwarding engine.

8. The look up mechanism of claim 4 further comprising validation means coupled with said look up table, said validation means comprising a data table containing an entry corresponding to each entry in said look up table, said validation table entry storing valid and invalid bits corresponding to each entry in said look up table indicating whether valid forwarding information is contained in each entry of said look up table.

9. The look up mechanism of claim 8 wherein said validation means is responsive to said comparison means such that if other valid information already exists in a location accessed, then said validation means increments to the next page of said look up table.

10. The look up mechanism of claim 1, wherein an input to said hashing element further comprises a hash configuration quantity which is a constant added to the address to be hashed whereby fewer addresses hash to the same hash key.

11. A look up mechanism for use by a forwarding engine in retrieving forwarding information associated with addresses received by the forwarding engine in rendering forwarding decisions for data frames transported among ports of a high-performance network switch, the look up mechanism comprising:

a look up table, configured as a plurality of pages, with each page containing a plurality of entries, each entry storing forwarding information comprised of an address and associated data relating to said forwarding decisions for that address;

a hashing element coupled to said look up table, the hashing element generating a hash key in response to the address received by the forwarding engine; and means for deriving a virtual first page from said hash key for a particular address which virtual first page maps a virtual first page to a physical page of said look up table to be initially accessed, and said hash key further mapping to a selected one of said forwarding table entries on that particular virtual first page.

12. The look up mechanism of claim 11, wherein data frames are transported among ports of the high-performance switch in accordance with virtual local area network (VLAN) associations among the ports, and the addresses received by the forwarding engine includes a media access control (MAC) address and a VLAN identifier comprising a MAC address/VLAN pair.

13. The look up mechanism of claim 12, wherein said look up table entries comprise a MAC address/VLAN pair and a unique index value identifying a port to which the frame is to be sent by the forwarding engine.

14. The look up mechanism of claim 13, wherein said hashing element transforms said MAC address/VLAN pair into said hash key using a hash function.

15. The look up mechanism of claim 11, wherein said look up table includes a short cut table containing Layer 3 short cut information accessible by said hash key.

16. A method of retrieving forwarding information for forwarding decisions rendered by a forwarding engine for data frames transported among ports of a high performance switch in accordance with virtual local area network (VLAN) associations among the ports, including the steps of:

(A) establishing a look up table, configured as a plurality of pages, with each page containing a plurality of entries, each entry for storing address information including a media access control (MAC) address and a VLAN designation in addition to associated data that includes a unique index value identifying a port associated with that MAC address/VLAN pair;

(B) hashing a MAC address/VLAN pair received by the forwarding engine as a forwarding address to produce a hash key;

(C) deriving a virtual first page from said hash key for a particular MAC address/VLAN pair which virtual first page determines a physical page of said look up table to be initially accessed; and (D) accessing said virtual first page and selecting an entry on said virtual first page identified by said hash key to retrieve said forwarding information.

* * * * *